Dec. 25, 1951 R. R. BATCHER 2,580,000
VARIABLE CONDENSER AND DRIVE MEANS THEREFOR
Filed July 14, 1945 3 Sheets-Sheet 2
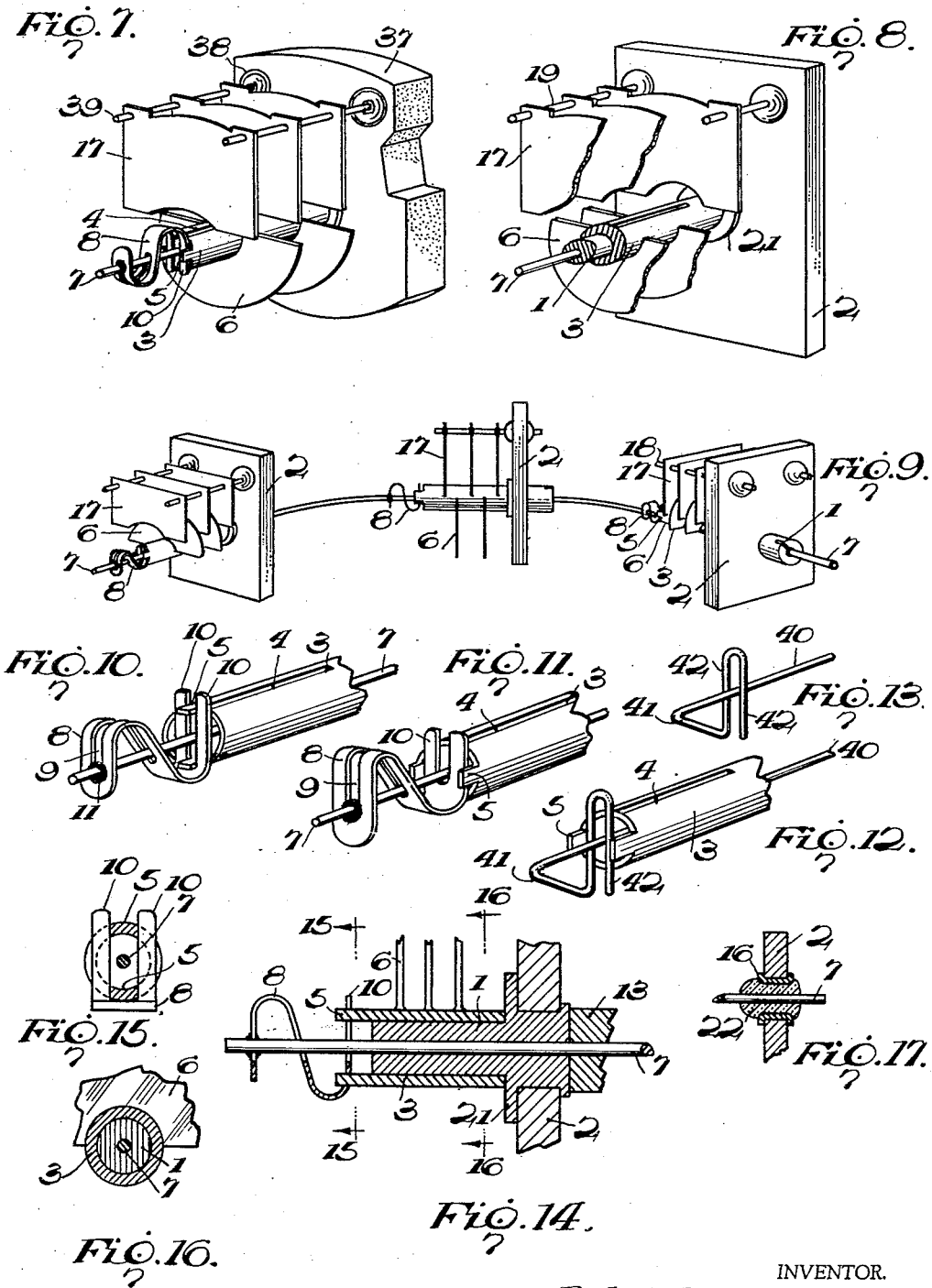
INVENTOR.
Ralph R. Batcher
BY Richard S. Ould
ATTORNEY.

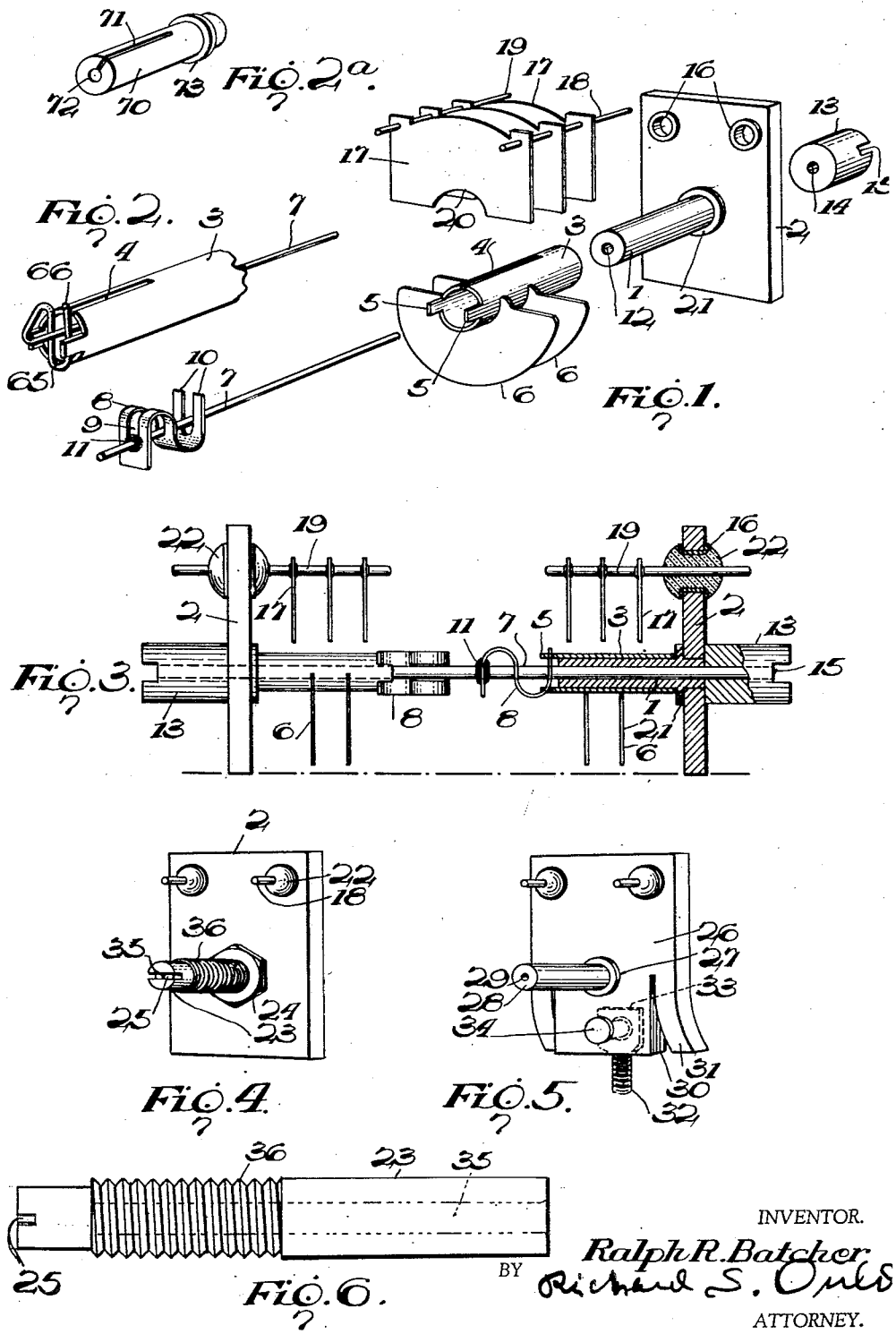

Dec. 25, 1951 R. R. BATCHER 2,580,000
VARIABLE CONDENSER AND DRIVE MEANS THEREFOR
Filed July 14, 1945 3 Sheets-Sheet 3
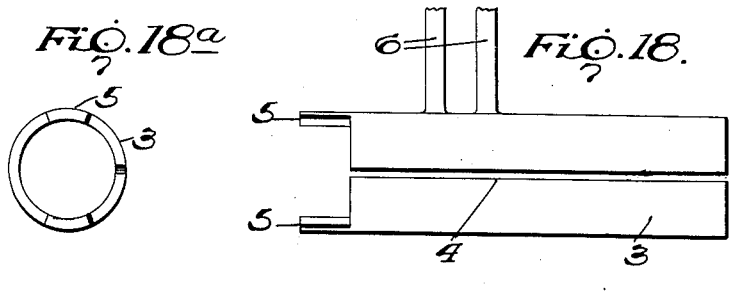
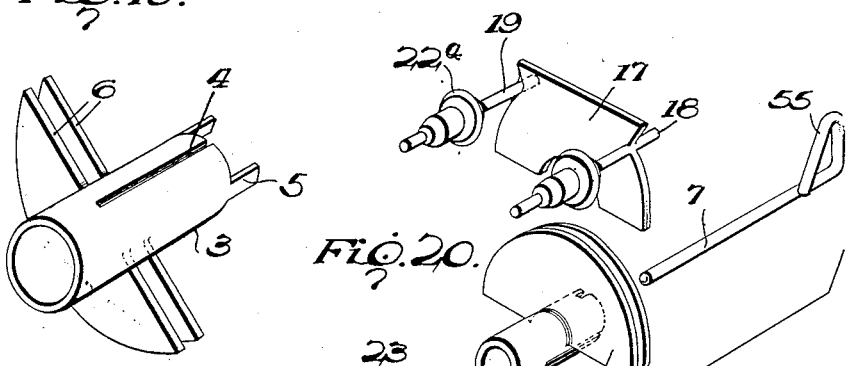
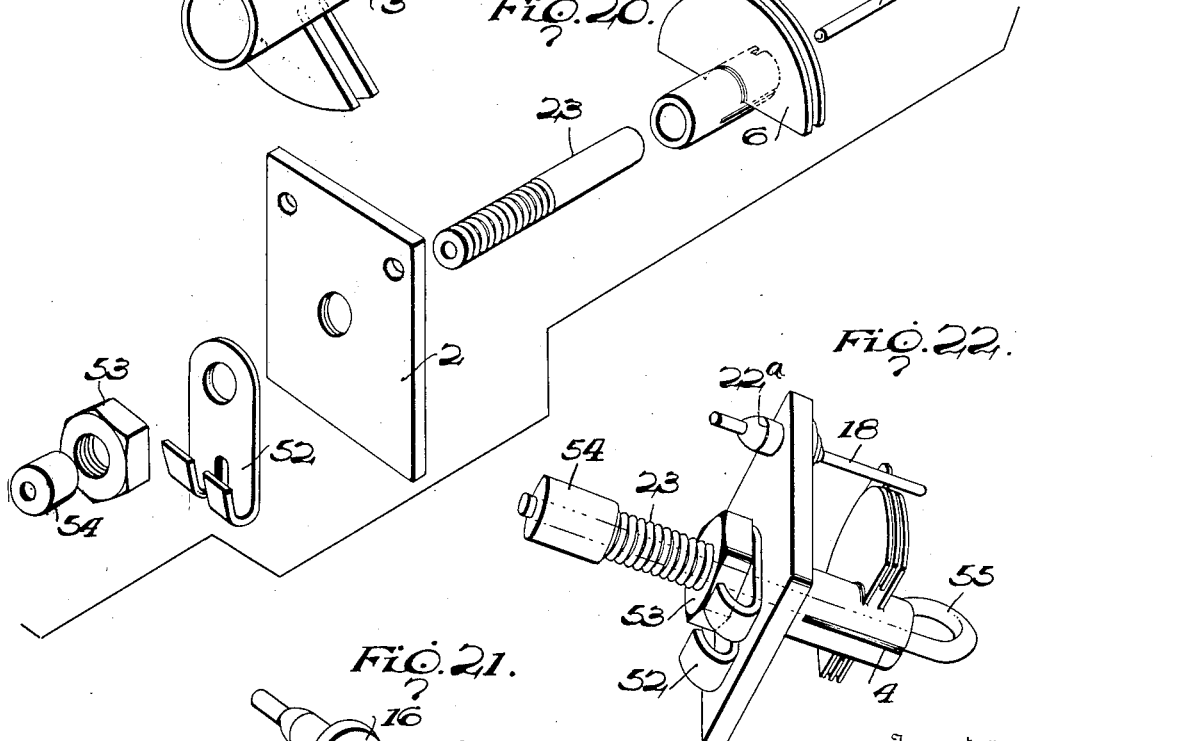
Inventor
Ralph R. Batcher
By Richard S. Ould
Attorney Patented Dec. 25, 1951

2,580,000

UNITED STATES PATENT OFFICE 2,580,000

VARIABLE CONDENSER AND DRIVE MEANS THEREFOR

Ralph R. Batcher, Douglaston, N. Y.

Application July 14, 1945, Serial No. 605,072

10 Claims. (Cl. 64—23)

My invention relates to variable condensers and in particular to a form of compact precision variable condenser having small operating clearances and particularly suitable for use on very high radio frequencies, and having a long sleeve bearing.

Many efforts have been made heretofore by others to provide such a precision variable condenser having small operating clearances, but all of these devices have failed to give satisfactory performance because either the plate spacings were large and the condenser bulky and mechanical clearances and tolerances relatively large, or with continued operation the plates got out of alignment and seriously affected the capacity or became short circuited.

In condensers heretofore available the rotor bearings were usually short sleeve bearings at one or both ends, which have many inequalities in their fit, resulting in lost motion.

One of the most serious difficulties of providing tuning circuits for ultra-high-frequency equipment lies in the design of the extremely small variable capacitors required. My invention provides a condenser which substantially meets this requirement.

In high-frequency circuit arrangements it is usually necessary to gang up a number of capacitors to a single common control. In using the condensers of the prior art in a practical layout of this kind, it has usually been found that the location of each of the succession of circuits was fixed by the physical separation of the units in the ganged assembly which location in general did not provide the most efficient layout from the point of view of other considerations. To provide the necessary separation between stages, the use of flexible shafts and coupling units between the various capacitor units in the gang was sometimes resorted to but this makes an elaborate and clumsy arrangement. In ordinary ganged condenser arrangements, the several units are relatively close together which requires cramped circuit assembly arrangements and causes higher interstage coupling effects, which are highly detrimental to efficient operation.

In most designs of the prior art having small physical dimensions, all parts are mounted on insulating plates of a ceramic or plastic material having large dimensional variation factors and a large capacitance drift with temperature. My invention provides a construction which facilitates the use of metal plates upon which various parts are mounted.

An object of my invention is to provide a small compact variable condenser of relatively high capacity having precision structural elements and precision fitting.

Another object of my invention is to provide a variable condenser in which the rotor is carried on a relatively long sleeve bearing.

A further object of my invention is to provide for an adjustably tight fit in the continuous sleeve bearing to eliminate lost motion by providing a slotted structure to alter the periphery of the sleeve portion of the bearing.

Still a further object of my invention is to provide a form of construction for a small compact variable condenser which is conveniently adapted for ganged control.

Yet another object of my invention is to provide a structure of variable condenser which is adjusted to permit the employment of wider production tolerances.

A further object of my invention is to provide a variable condenser having a minimum number of parts.

Still another object of my invention is to provide a drive for a rotary variable condenser having a flexible torque coupling between the driving member and the rotor sleeve that transmits only rotary movement to the rotor.

A still further object of my invention is to provide a condenser structure wherein there are employed metal mounting plates whereon the supporting elements of the condenser plates are mounted in glass beads which are fused into place in holes in the metal plate.

Yet another object of my invention is to provide a condenser structure whose capacitance is substantially constant over the usual operating temperature range.

Another object of my invention is to provide a condenser structure wherein the electrical path for high-frequency currents is of relatively short length and the current path from the rotor to its mounting member is a path of low resistance.

I provide a condenser with a particular structure of bearing sleeve which can be easily constructed with sufficient accuracy to maintain a constant value of air-gap space, and a small air-gap space can be employed without danger of a short circuit, making possible the employment of a small number of plates of small dimensions, to obtain a desired value of capacitance.

It is important to obtain a relatively long and tight bearing for the rotor, and for this purpose I provide a central axial drive wire or rod with a torque spring coupling. The bearing can be made as long as desired up to or greater than the full length of the rotor assembly and is concentric with the drive rod. Moreover, the tube or sleeve carrying the rotor plates, which I employ, turns on a stationary hollow stud. Either the sleeve or the stud may be provided with a longitudinal or axial slot extending through a substantial portion of its length, to facilitate a closer and tighter fit between the stud and the sleeve. The hollow stud upon which the sleeve rotates, is screwed, riveted, or otherwise forced into the end plate.

This slotted cylindrical rotor bearing takes up variations in manufacturing tolerances and provides a fit which is as tight as is desired.

My invention will be better understood by reference to the following specification and the accompanying drawings wherein corresponding parts are indicated by like characters of reference in all the views and wherein:

Figure 1 is an exploded view of the structural elements of my rotary variable condenser shown in juxtaposition;

Figure 2 is an alternative form of the torque spring drive;

Figure 2a shows a longitudinally slotted mounting stud;

Figure 3 is an elevation with parts in section of two ganged rotary variable condensers, showing the driving element;

Figure 4 shows a form of mounting the axial stud carrying the rotor axle onto the main mounting plate, employing a threaded stud which is screwed into the mounting plate;

Figure 5 shows another manner of mounting the axle stud by forcing the stud in and riveting it to the mounting plate, together with the bottom mounting screw to facilitate mounting of the plate on a chassis;

Figure 6 shows on an enlarged scale the threaded stud which carries the rotor axle and is provided with an axial bore to receive the drive rod or wire;

Figure 7 shows a condenser with a ceramic base of the usual ceramic type, embodying my structure, including the torque spring driving the condenser plates;

Figure 8 shows the condenser of Figure 3 with parts broken away, the drive wire projecting from the axial bore in the stud on which the rotor axle is journaled;

Figure 9 shows in perspective an assembly of three condensers ganged to a single flexible control or drive wire or shaft, by means of individual torque springs;

Figure 10 shows in perspective one form of torque spring soldered to the drive wire with its tines between which fingers of the rotor axle are received;

Figure 11 shows in perspective the mounting of a similar torque spring with its tines received between fingers of the rotor axle;

Figure 12 shows in perspective a form of torque drive wire with a terminal U-loop engaging fingers of the rotor axle;

Figure 13 shows the torque drive wire of Figure 12 alone;

Figure 14 shows a central longitudinal section through the condenser rotor axle and mounting stud and drive wire, showing the tines of the torque spring engaging the axle fingers;

Figure 15 is a cross section of the rotor assembly taken on the line 15—15 of Figure 14, through the rotor axle fingers, showing engagement of the right end of the torque spring tines and the portion of the torque spring to the left of the tines being removed;

Figure 16 is a cross section of the rotor assembly taken on the line 16—16 of Figure 14, showing the condenser plate carried on its axle surrounding the mounting stud and the drive rod or wire;

Figure 17 is a detail showing a glass bead insulation mounting of a rod carrying stator plates;

Figure 18 shows in side elevation a detail of a slotted rotor tube or axle carrying rotor plates, to provide a tight fit;

Figure 18a is an end elevation of the rotor tube of Figure 18 with rotor plates removed;

Figure 19 shows in perspective a rotor assembly with slotted axle and two plates;

Figure 20 shows in perspective an exploded view of a condenser unit with which the rotor of Figure 19 is used, showing one stator plate with its insulated support, and the threaded mounting of the stud carrying the rotor;

Figure 21 is a detail of the insulated mounting of the stud which carries the stator plates in the unit of Figure 20;

Figure 22 shows in perspective an assembled unit embodying the parts of Figures 19, 20, 21, with one stator plate and two rotor plates, and a slotted rotor axle.

Referring to the figures in detail, in Figure 1 a hollow mounting stud is shown at 1 for journaling the rotor which stud is fixedly mounted in suitable manner on a main supporting or base plate 2 which, in the form of the invention shown in Figure 1, is of metal. A boss 21 on the mounting stud facilitates its attachment perpendicular to plate 2. The rotor unit consists of a tubular member or axle 3 whereon are radially mounted semicircular rotor plates 6, 6. Extending from one end of the tube 3 is an axial or longitudinal narrow slot 4, to facilitate a tight fit, as heretofore described. This eliminates all lost motion between rotor tube and axle stud, which may be accomplished by slot 4. From one end of tube 3 there project two opposed tines 5, 5, to engage the torque spring hereafter described.

Through the center of mounting stud 1 there is provided an axial bore 12 wherein loosely fits a resilient flexible drive wire or rod 7 on which is fixedly mounted as by soldering at 11, a torque spring 8 having a wire engaging slot 9 and terminal tines 10, 10, which tines are adapted to engage the tines 5, 5 of tube 3. A cylindrical stub shaft or drive member 13 provided with an axial bore 14 and a diametral drive slot 15, is positioned on the side of base plate 2 remote from the rotor plates and is designed and adapted to be attached to the drive assembly or knob whereby rotary motion can be applied to the drive rod or wire 7. The bore 14 in drive member 13 is of such diameter that drive member 13 must be forced onto drive wire 7 to tightly engage it. Drive member 13 may be about ¼" in diameter. In the base plate 2 there are provided two circular apertures wherein eyelets 16, 16 are fitted to receive the glass pillars which mount the stator plates.

The stator plates 17, 17 are spacedly carried on mounting rods 18, 19 which, as particularly shown in Figure 17, are held within eyelets 16, 16 by glass pillars or beads 22 which are fused into place. Stator plates 17 are provided with a semicircular recess 20 for clearing the rotor tube or axle 3. The mounting rods or wires 18, 19 and the eyelets 16, 16 are preferably made of a metal like "Dumet" which has a temperature coefficient of expansion substantially the same as that of glass, to provide for minimum stress at their junctures with variations of temperature. The bearing surfaces of sleeve 3 on stud 1 are long and concentric with the axis of the stud.

Figure 2 shows an alternative form of torque drive wherein the drive wire is provided with a re-entrant bend and terminal U-loop 65 for engaging the inner faces of the tines 5, 5 of rotor axle 3.

In Figure 3 there is shown a two-condenser gang of the type shown in Figure 1, with the torque spring soldered in place at 11 on drive rod or wire 7, with the bottom portions of stator plates 17 broken away. It will be noted that the tube or axle or bearing member 3 is long, and the bearing surface is the total length of the rotating member supporting the rotor plates, and, therefore, the bearing has maximum precision without undue manufacturing difficulties, since a long bearing is much less affected by side motions than a short bearing.

The slot 4 shown particularly in Figure 1 increases the operating precision, as the periphery of the tube or axle 3 expands or contracts to closely conform to and fit the axle stud in all positions.

Instead of slotting tube 3, it may, in some cases, be found desirable to provide a longitudinal slot 71 extending most of the length of the stud outside of plate 2, as shown in Figure 2a, but I usually find it preferable to slot tube 3.

It will be realized that in the arrangements shown in Figures 1 and 3 the rotor structure is driven from the central co-axial drive wire or rod only by the resilient coupling or torque spring 8, which will take up longitudinal thrust, so that any longitudinal movement which may be applied to drive wire 7 is not transmitted to the rotor assembly, but that the only motion transmitted from drive wire 7 to the rotor assembly is rotary motion. Any side motion or end thrust which may be applied to the free end of the drive wire 7 does not affect the angular position of the sleeve 3. Another function of the torque spring is to keep the rotor assembly forced against the boss on the stud 1 to prevent its sliding axially along the stud while being rotated.

It will also be apparent from Figure 3 that the condenser unit structure of my invention may be conveniently applied to two or more condenser units arranged in tandem, to provide a gang arrangement, with the feature that the individual units of the gang are not necessarily locked close together which would bring about circuit congestion which is usually encountered in gang condenser units of the prior art.

It is not necessary to have exact alignment of the several individual condenser units, because the drive wire or rod 7 is resiliently flexible and may be bent around a considerable angle without interfering with its transmission of rotary motion, as will be particularly apparent from the three-gang arrangement shown in Figure 9.

It will be apparent that the structure which has been described does not require that the drive wire 7 shall have a precise uniform diameter, since it fits only loosely in the bore 12 of the mounting stud 1, and that the essential operating requirement is simply that drive wire 7 shall be stiff enough to apply the required torque. The drive wire 7 may conveniently be a piano wire having a diameter of approximately 0.05". The torque spring 8 is desirably made from a suitable resilient spring metal strip.

As shown particularly in Figures 3, 7, 10, 11, the torque spring 8 is a flat blade having a thickness dimension much less than its breadth, and is bent in S-shape so that it traverses the axis of drive wire 7 and preferably is provided with a longitudinal slot 9 which receives drive wire 7 at the points of traverse.

The stud 1 may be affixed rigidly to plate 2 in perpendicular relation in several ways. A method which is alternative to the forced fit of Figure 1 is shown in Figure 4 where the stud 23 provided with an axial bore 35 and carrying the rotor tube or sleeve has threads 36 and terminal slot 25. In this arrangement, mounting base plate 2 is provided with the threaded circular aperture wherein the threads 36 of stud 23 fit, and is held locked in place by lock nut 24. The terminal screw driver slot 25 of stud 23 permits rotational adjustment. This provides for a precisely locked mounting.

For more rapid production, the stud may, as shown in Figure 5, be forced into a mounting base plate 26, up to the shoulder provided by the boss 27. The boss 27 is turned on the end side of the stud. The portion of the stud to the right of this boss in Figure 5 may be provided with a parallel knurl to get a tight fit. In Figure 5 there is also shown a mounting screw 32 which is held in place by a rivet 34 and which may be conveniently employed for mounting the base plate 26 on a chassis or other support in desired manner. The slits 30 may be provided to provide a wider space for mounting this plate, to secure increased rigidity between condenser and chassis.

As will be particularly apparent from the enlarged showing of Figure 6, the threaded stud 23 of Figure 4 is provided with an axial bore shown at 35 in Figure 6, and with threads 36. In condensers of dimensions which I have employed in a particular unit for the purposes here in view, this stud is made from $\frac{1}{8}$" rod and is about 1" long and is provided with an axial bore having a diameter of .053" and is provided with 5—40 threads. The dimensions of the parts of a particular unit necessarily depend on the kind of materials used and the capacitance and type of service desired.

In Figure 7 I have shown the application of the structure of my invention to a condenser having a ceramic mounting base plate 37 wherein are fitted eyelets 38 to which the stator mounting posts 39 are soldered while they are jig held. Figure 7 also shows the torque spring 8 with its tines 10 held in place between terminal fingers or tines 5 of the rotor tube 3.

Figure 8 shows a rotor and stator assembly mounted on a metal base plate 2, with parts broken away, to more clearly show the co-axial relations of drive wire 7, stud 1, and rotor axle 3.

Figure 9 shows a gang of three condensers mounted on the common drive wire 7, and as shown, the resilient flexibility of drive wire 7 makes it possible to bend the same relatively sharply, without interfering with the transmission of rotary motion, so that it is not necessary to have the condenser units substantially parallel with the other axes of rotation of the several condenser units substantially aligned co-linearly, as would be necessary with the structures of the prior art. Each of the torque springs 8 in the three-gang arrangement of Figure 9 has one point soldered fixedly to drive wire 7, and the other end of the torque spring lockingly engages the terminal tines of the rotor tube or axle to transmit thereto the rotary movement of drive wire 7, while at the same time forcing said rotor tube against the stop at the other end, Figure 10 shows the application of one form of torque spring to the drive wire and tines of the rotor tube, with the tines 10, 10, of the torque spring 8 surrounding and receiving the terminal tines 5 of rotor tube 3.

Figure 11 shows another manner of applying the same form of torque spring 8 of Figure 10 so that the tines 10, 10 of torque spring 8 are received between and engage the inside faces of terminal tines 5, 5 of rotor tube 3.

Figure 12 shows another manner of applying the rotary motion of the drive wire 40 to rotor tube 3 by providing at the end of the drive wire a re-entrant bend terminating in a U-turn 42 which is dimensioned to closely engage the inner faces of the terminal tines 5, 5 of rotor tube 3. This arrangement for the terminal condenser of an assembly is simple and convenient, and may often be employed satisfactorily. The drive wire 40 of Figure 12 is shown alone in Figure 13, with the re-entrant bent portion 41 and the terminal U portion 42, 42.

Other forms of resilient structure may be used to couple the drive wire to the rotor axle and transmit rotary motion thereto, and to prevent axial movement of the rotor tube along the central stud away from the mounting plate because of rotary or vibrational movements, providing the engagement with the rotor tube is positive and there is no lost motion.

Figure 14 brings out in longitudinal section the details of the rotor assembly and the drive wire 7 received in the bore in the stud 1, which latter in the arrangement shown in Figure 14 is riveted into base plate 2, the operating shaft member 13 to which a dial or knob for transmitting rotary motion can be affixed, and the rotor tube or sleeve 3 journaled on stud 1.

Figure 15 is a section taken on the line 15—15 of Figure 14 transversely through the tines 5, 5, and brings out the details of the locking of tines 5, 5, of the rotor tube 3, between the tines 10, 10 of torque spring 8.

Figure 16 is a section taken on line 16—16 of Figure 14 and shows the drive rod 7 surrounded by stud 1 and rotor tube 3, with a fragment of a rotor plate carried by rotor tube 3.

Figure 18 shows a detail of the rotor tube whereon rotor blades are mounted including the slot 4 and terminal tines 5. In a condenser structure which I have employed for the frequencies here in view, this rotor tube conveniently may have an overall length of ⅝" with tines $\frac{1}{16}$" long and $\frac{1}{16}$" wide and an outside diameter of $\frac{5}{32}$", and an inside diameter of ⅛", the slot here extending the full length of the tube, but a similar tube may be employed with slot extending ½".

Figure 19 shows in perspective, details of the rotor tube 3 provided with longitudinal slot 4 and carrying rotor plates 6, 6.

Figure 20 brings out in perspective the details of the stator and fixed mounting assembly including the threaded stud 23 and its lock nut 53 and the stator plates supporting rods 18, 19 with their insulated glass beads 22 fused in place, the soldering or wiring lug 52, and the rotor sleeve and plates. A sleeve 54 is provided over drive wire 7 to facilitate connection of a dial or knob to the drive wire.

Figure 21 shows a detail of a stator mounting rod with its eyelet 16 and insulator 22.

Figure 22 shows in perspective an assembled condenser unit embodying the rotor of Figure 19 and the stator of Figure 20, and shows a terminal loop 55 for imparting rotary motion to the drive shaft.

The condenser structure which I provide minimizes manufacturing and production variations, and produces a design of particular advantage in cases in which small closely spaced plate arrangements are necessary for ultra-high-frequency circuits. In such a condenser embodying my invention the plates may have a spacing of say only 0.005" producing a capacitance of as much as 45 micromicrofarads per square inch of plate area. The very small plates thus made possible are highly important in ultra-high-frequency circuits. Since the volume or overall bulk of a capacitor varies as the square of the plate spacing, it will be apparent that the close spacing which is possible with the construction of my invention makes possible a very compact condenser unit without the possibility of short circuits and other operating difficulties.

The condenser of my invention also eliminates all lost motion in rotor mounting which in the structure of the prior art is occasioned by inequalities in the fit of the rotor bearings which are usually short sleeve bearings on the ends of the shafts. The no lost motion feature is particularly important in condensers with a considerable number of rotor plates. In my construction, the longer the rotor assembly, the longer the bearing, so that precision is attained at all times. A smaller number of parts is necessary with my construction, and the high-frequency paths are extremely short.

The structure of the condenser of my invention makes possible the employment of the metal base plate 2, and this makes it possible to very closely control and minimize the capacitance drift with temperature, since the expansion factors in an all-metal construction can be much more readily determined and corrected for, than if the mounting base plate is of ceramic or other insulating material, whose temperature behavior is much less predictable.

It is possible to extend the drive wire that passes through the axle bore in the mounting stud to any distance for remote control purposes, and one such drive wire can be coupled to a successive drive wire by a coupling sleeve. In the construction of my arrangement, successive condenser units may be mounted on a single length of piano wire or other drive wire at whatever spacing is convenient.

While I have described my invention particularly as applied to a metal mounting base plate 2, it will be apparent, as shown in Figure 7, that my invention is also susceptible of application to a ceramic or other insulating mounting base plate.

Because of relatively large production tolerances, the condensers of the prior art are found to have loose fits of the cooperating structural parts, and consequently attain poor precision. In the condenser embodying the structure of my invention there is attained precision in capacitance without the necessity of close manufacturing tolerances. My structure makes it possible to attain as tight a fit as is desired of the condenser axle on the mounting stud, and inaccuracies of assembly are readily taken up. A feature of the condenser structure of my invention is that the application of the rotary drive motion is centrally applied through the axial wire, which is a decided advantage over most of the structures of the prior art.

It is important to eliminate lost motion between the rotor tube and its mounting stud which is attained by the structure of my invention.

Since the structure of my invention makes it possible to provide a slit in the tube on which the rotor plates are mounted, it permits wider manufacturing tolerances without effecting side play and lost motion inherent in the forms of bearing employed in the prior art.

Employing the condenser structure of my invention, the designer of high-frequency radio circuits and apparatus need not assemble all the parts of a tuning system close together, and has a great deal more freedom in laying out all the parts since the mechanical tuning drive for the successive stages operates efficiently over considerable distance without lost motion or back lash.

It will be apparent that I have provided a structure of a rotary variable condenser which is rugged and dependable in operation and is susceptible of quantity production without close manufacturing tolerances without prejudical effect upon operating characteristics, and which will produce precision operating characteristics of ultra-high-frequency circuits wherein it is employed.

It will be evident to those skilled in the art that my invention is susceptible of various modifications to adapt it to particular structures and applications, and all such modifications, which are within the scope of the appended claims, I consider to be comprehended within the spirit of my invention.

What I claim is:

1. In a coupling arrangement, mounting means, a driving shaft rotatably carried by said means, a hollow driven shaft rotatably carried by said means and concentrically surrounding said driving shaft over a portion of its length, and a resilient blade spring bent in S-shape connecting said driving shaft to said driven shaft, said blade spring being rigid in torsion and resiliently deformable in the longitudinal direction of said shafts.

2. A coupling arrangement according to claim 1, said blade spring being so positioned as to traverse said driving shaft and being provided with a longitudinal slot spacedly receiving said driving shaft at points where said blade spring traverses said driving shaft.

3. In a coupling arrangement, mounting means, a driving shaft rotatably carried by said means, a hollow driven shaft rotatably carried by said means, concentrically surrounding said driving shaft over a part of its length, and having terminal tines at a first end thereof, and a resilient blade spring bent in S-shape connecting said driving shaft to said driven shaft, a first end of said blade spring being rigidly fixed to said driving shaft at a point spaced from said first end of said driven shaft, said blade spring having at its second end terminal tines tightly lockingly engaging said tines of said driven shaft, said blade spring being rigid in torsion and resiliently deformable in the longitudinal direction of said shafts.

4. In a coupling arrangement, supporting means, a driving shaft rotatably carried by said means, a hollow driven shaft rotatably carried by said means and concentrically surrounding said driving shaft over a portion of its length, an abutment plate positioned transversely of said shafts and fixedly supporting said supporting means, stop means carried by said driving shaft and engageable with said plate for limiting longitudinal displacement in one direction of said driving shaft with reference to said plate, and a resilient blade spring bent in S-shape connecting said driving shaft to said driven shaft, said blade spring being rigid in torsion and resiliently deformable in the longitudinal direction of said shafts and urging said driven shaft longitudinally axially toward said plate.

5. In a coupling arrangement, supporting means, a driving shaft rotatably mounted on said means, a hollow driven shaft rotatably carried by said means and concentrically surrounding said driving shaft over a portion of its length, an abutment plate positioned transversely of said shafts and fixedly supporting said supporting means, stop means carried by said driving shaft and engageable with said plate for limiting longitudinal displacement in one direction of said driving shaft wth reference to said plate, and a resilient blade spring bent in S-shape connecting said driving shaft to said driven shaft, a first end of said blade spring being rigidly fixed to said driving shaft at a point thereof spaced from the nearest end of said driven shaft, said blade spring being mounted between said point and said nearest end of said driven shaft and urging said driven shaft longitudinally axially toward said plate, said blade spring being rigid in torsion and resiliently deformable in the longitudinal direction of said shafts.

6. In a coupling arrangement, a driving shaft, a hollow driven shaft surrounding said driving shaft over a portion of its length, a supporting plate comprising a bearing, said driven shaft being rotatably supported on said bearing, said supporting plate being mounted extending transversely of said shafts, stop means carried by said driving shaft and engageable with said plate for limiting longitudinal displacement in one direction of said driving shaft with reference to said plate, and a resilient blade spring bent in S-shape connecting said driving shaft to said driven shaft, said blade spring being rigid in torsion and resiliently deformable in the longitudinal direction of said shafts and urging said driven shaft toward said plate.

7. A coupling arrangement according to claim 4, said blade spring being so positioned as to traverse said driving shaft and being provided with a longitudinal slot spacedly receiving said driving shaft at points where said blade spring so traverses said driving shaft.

8. In a coupling arrangement for a variable condenser, a driving shaft, an abutment unit comprising a flat member positioned transversely of said shaft, a cylindrical stud member comprising a terminal boss and being fixedly attached to said flat member by its end comprising said boss, said stud member being provided with an axial bore through which said shaft extends freely, a hollow driven rotor member comprising a sleeve fitting on said stud member and concentrically surrounding said driving shaft over a portion of its length, stop means carried by said driving shaft and engageable with said flat member for limiting longitudinal displacement in one direction of said driving shaft with reference to said flat member, and a resilient blade spring bent in S-shape connecting said driving shaft to said driven rotor member, a first end of said blade spring being rigidly fixed to said driving shaft at a point thereof spaced from the nearest end of said driven rotor member, said blade spring being resiliently held and pressed between said point and said nearest end of said driven rotor member and urging said driven rotor member longitudinally axially against said terminal boss, said blade spring being rigid in torsion and resiliently deformable in the longitudinal direction of said shaft.

9. A coupling arrangement according to claim 8, said driven rotor member being provided at its said nearest end with terminal tines, and said blade spring having at its second end terminal tines tightly lockingly engaging said tines of said driven rotor member.

10. In a rotary drive unit, a fixed support, a cylindrical stud member fixedly mounted on said support, said stud member being provided with an axial bore and said fixed support being provided with a bore in register with said bore in said stud member, a drive rod member extending freely through the bore in said stud member and the bore in said support and beyond the ends of said stud member and said support, a rotor assembly comprising a rotating element and a cylindrical sleeve member fitting loosely rotatably on said stud member and whereon said rotating element is fixedly mounted, and concentrically surrounding said drive rod member over a portion of its length, a resilient blade spring bent in S-shape connecting said drive rod member at one point thereof beyond the free end of said stud member to said sleeve member for the transmission of torque therebetween, said blade spring being rigid in torsion and resiliently deformable in the longitudinal direction of said drive rod member and of said sleeve member, and means for applying torque to said drive rod member at a point thereof on the side of said stud member and said support opposite to the side on which said drive rod member is so connected to said sleeve member.

RALPH R. BATCHER.

REFERENCES CITED

The following references are of record in the file of this patent:

UNITED STATES PATENTS

| Number | Name | Date |
|---|---|---|
| 1,641,314 | Bradley | Sept. 6, 1927 |
| 1,695,343 | Pierce | Dec. 18, 1928 |
| 1,706,148 | De Tar | Mar. 19, 1929 |
| 1,871,293 | Alden | Aug. 9, 1932 |
| 2,246,750 | Murphy | June 24, 1941 |

FOREIGN PATENTS

| Number | Country | Date |
|---|---|---|
| 437,150 | Great Britain | Oct. 24, 1935 |
| 482,053 | Great Britain | Mar. 23, 1938 |